UNITED STATES PATENT OFFICE 2,441,298

UNSATURATED ESTERS

Franklin Strain, Barberton, Ohio, assignor to Pittsburgh Plate Glass Company, Pittsburgh, Pa., a corporation of Pennsylvania No Drawing. Application March 29, 1944, Serial No. 528,617

11 Claims. (Cl. 260—77.5)

This invention relates to a new group of unsaturated ester-amides having valuable properties as described hereinafter.

One purpose of this invention is to prepare a new group of compounds capable of being polymerized through olefinic groups to form resinous compositions having improved tensile and flexural strength properties. A further purpose of this invention is to provide a novel and simple method of preparing useful synthetic resins.

The new compounds are the oxycarbalkenyloxyalkyl N-(oxycarbalkenyloxyalkyl) carbamates wherein the alkenyloxy groups contain olefinic linkages adjacent the second carbon from the oxygen atom therein. The new compounds have the following general molecular structure:

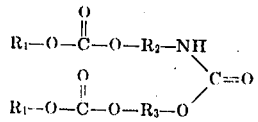

wherein $R_1$ is an alkenyl radical such as allyl, vinyl, or substituted allyl and vinyl radicals, and wherein $R_2$ and $R_3$ are alkylene radicals containing two or more carbon atoms.

My new group of compounds may be prepared by reaction of ethylene carbonate, propylene carbonate, or other alkylene carbonate, diethylene glycol polycarbonate, or other superpolycarbonate, with an aminoalcohol, such as ethanolamine and propanolamine, or any other simple hydrocarbon having a single substituent amino group and a single substituent hydroxy group and treating the resulting compound with a chloroformate of an unsaturated alcohol, such as allyl chloroformate or vinyl chloroformate. Vinyl chloroformate can be prepared by the pyrolysis of ethylene bis (chloroformate) as described and claimed in U. S. Patent No. 2,377,085, issued on May 29, 1945 to Frederick E. Küng.

The alkylene carbonates required in the above described reaction may be prepared by the interreaction of an alkylene glycol with an ester of carbonic acid in the presence of an interchange catalyst. Alternatively they may be prepared by treating the alkylene glycol with phosgene.

The reaction between an alkylene carbonate and an amino alcohol is preferably conducted at or near normal temperatures, cooling the reaction flask in an ice bath or other suitable refrigerant if necessary. It usually is desirable to heat the reaction mass near the end of the reaction to obtain satisfactory completion. When the reaction is complete, the hydroxyalkyl N-(hydroxyalkyl) carbamate may be separated by vacuum distillation or fractional crystallization. The intermediate polyhydroxy compound produced in accordance with the above described procedure is then reacted with an unsaturated chloroformate in the presence of pyridine or other cyclic tertiary amine or with an oxide, carbonate, or hydroxide of an alkali metal, preferably at temperatures less than 15° C. The reaction should be conducted in liquid phase, and accordingly, if the intermediate hydroxy compound or the final product is a solid or a viscous liquid it will be necessary to conduct the reaction in the presence of a suitable solvent such as dioxane. The reaction is exothermic and the heat evolved must be removed by maintaining a subnormal temperature around the reaction vessel. The use of a mechanical stirring device will assist the dissipation of the heat of reaction and avoid local excesses in temperature. In order to avoid an excessive rate of reaction the reactants are combined gradually at a rate which permits the maintenance of the reaction temperature within prescribed limits. The combination of reactants is conducted in such a manner as to avoid the presence of a large excess of strong basic reagent in contact with either the chloroformate or the final carbonate ester. Thus, when caustic soda is used as the basic reagent it should be added gradually to the mixture of chloroformate and hydroxy substituted carbamate. Alternatively, the caustic and the chloroformate may be added in separate streams to the hydroxyalkyl substituted carbamate.

Upon the completion of the reaction, sufficient water should be added to dissolve all salts formed during the reaction. The reaction mass will then separate into two liquid phases. The ester layer containing the organic solvent, if such be present, is washed with dilute hydrochloric acid to remove the excess basic reagent, then with sodium carbonate to remove the traces of acid, and finally with water. If necessary, the product may be decolorized by heating at 70° C. with a small proportion of activated charcoal. The products so obtained are colorless transparent liquids or readily fusible crystalline compounds.

The new compounds may also be prepared from the hydroxyalkyl N-(hydroxyalkyl) carbamates by a different method. The dihydroxy amides or solutions thereof may be reacted with phosgene to form the corresponding bis (chloroformate) esters which are subsequently treated with a suitable unsaturated alcohol in the presence of a basic reagent to form the desirable new compounds. This reaction is conducted at subnormal temperatures in liquid phase as described above.

The new ester-amides are capable of being polymerized when subjected to heat or ultraviolet light especially in the presence of a polymerization catalyst such as an organic peroxy compound. During polymerization the liquid monomers gradually become viscous and finally set to form rigid, colorless, transparent gels. If the initial polymerization is conducted at a moderate temperature in the presence of an oxygen yielding catalyst it is possible to obtain an intermediate product which contains some unused catalyst. Such compositions are capable of further polymerization to form hard resins which are neither soluble nor fusible. When the initial catalytic polymerization is induced at higher temperatures the rate of decomposition of the catalyst may exceed the rate of polymerization and a relatively softer polymer may be formed. Such inefficient utilization of catalyst is undesirable.

There is a further practical limitation on the rate of polymerization. The polymerization reaction being exothermic, the rate of reaction must be slow enough to permit the dissipation of the heat evolved. Otherwise, the rise in temperature will increase the rate of polymerization, thereby generating progressively increasing quantities of heat until the polymer is destroyed by heat fractures. High polymerization temperatures may also cause discoloration of the polymer. Accordingly, lower temperatures are preferred. For each combination of ester amide and catalyst there is an optimum quantity of catalyst and temperature of polymerization, which will permit complete polymerization without discoloration or heat fractures.

Polymerization may take place in the absence of added catalysts, but higher temperatures are then required. Due to the difficulty of maintaining uniform polymerization conditions and due to the discoloration and fracturing induced at higher temperatures, polymerization in the presence of peroxy catalyst is preferred.

The quantity and kind of peroxy catalyst to be used should be determined by the nature of the monomer to be reacted. Very active monomers such as the vinyl esters need only small quantities such as from 0.01 percent to 0.5 percent by weight of the monomer, while moderately active monomers such as the allyl derivatives may require up to 5.0 percent. It has been found that different types of peroxy catalyst are effective at different temperatures; for example, the percarbonates will catalyze the reaction at 30° C. to 60° C., acyl peroxides are effective at an intermediate range (65° C. to 95° C.), while the ketone peroxides are effective at temperatures in excess of 110° C. The kind of catalyst should be selected in accordance with the activity of the monomer. Very active vinyl derivatives require low temperature catalysts since at high temperatures the polymerization may be too rapid. Conversely, relatively less active monomers such as crotyl or cinnamyl esters must be heated to relatively high temperatures and require a catalyst which will not decompose before the higher temperatures are reached.

In the usual polymerization procedure it has been found desirable to initiate the reaction at relatively low temperatures. After the polymerization has begun it is possible to increase the temperature with less danger of heat fracture and discoloration. Accordingly, the quickest satisfactory reaction is obtained by raising the temperature as rapidly as possible without fracturing or discoloring the product. Such gradually increasing temperature schedules are more efficient in the utilization of peroxy catalysts since they promote a more nearly uniform reaction rate throughout the entire polymerization. The temperature schedules may be devised by trial and error methods, or they may be determined by analyzing for peroxy compound during the progress of the reaction and regulating the temperature so that the peroxy compound is consumed at a uniform rate. The following time-temperature schedule is typical for the polymerization of the new compounds using benzoyl peroxide as the catalyst:

| Temperature | Elapsed Time |
| --- | --- |
|  | Hours |
| 70° C | 1 |
| 71° C | 2 |
| 72° C | 3 |
| 74° C | 4 |
| 77° C | 5 |
| 81° C | 6 |
| 86° C | 7 |
| 92° C | 8 |
| 100° C | 9 |
| 115° C | 10 |

The new esters are useful in many applications such as in coating compositions, in laminated fabrics, in the impregnation of cloth or random fiber compositions, or as adhesives. They are especially useful because of the very small loss of volume or shrinkage which occurs during polymerization. For this reason they are very useful in the preparation of cast shapes especially where transparent, translucent or light colored products are required. Generally, any irregular shape, usually made of glass, may be advantageously formed by casting the new resins because of the much greater toughness and high flexural strength obtained without much sacrifice in resistance to abrasion.

The new materials may be copolymerized with other polyunsaturated compounds or with materials such as vinyl acetate, styrene, methyl methacrylate, vinyl chloride, vinylidene chloride or other materials capable of ethylenic polymerization.

Further details of the preparation and use of the new materials are set forth in the following examples:

*Example I*

A mixture of 420 parts by weight of ethyl carbonate, 186 parts of ethylene glycol and 6 parts of sodium were heated for two hours at 140–170° C. The solid residue thereby produced was extracted with benzene and the solvent evaporated. A substantial yield of ethylene carbonate was thereby obtained as a white crystalline solid (M. P. 40° C.).

Sixty-two parts by weight of ethanolamine were placed in a reaction vessel provided with a stirrer and immersed in an ice bath. Ethylene carbonate (49 parts) was added in small quantities at intervals sufficient to permit the maintenance of the temperature below +15° C. After the reactants were combined the mass was gradually heated to 50° C. for one half hour and then distilled at 2 mm. pressure. The fraction boiling at 145–150° C. was identified as 2-hydroxyethyl N-(2-hydroxyethyl) carbamate having the molecular structure:

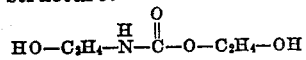

A mixture of 64 parts by weight of the intermediate hydroxy compound, 80 parts of pyridine, and 150 parts of dioxane was cooled to 0° C. in a reaction vessel provided with a mechanical stirring device. Allyl chloroformate (100 parts) was added slowly at a rate which permitted the maintenance of the temperature below +8° C. The reaction vessel was cooled on an ice bath during the reaction and the reaction mass stirred vigorously to avoid local increases in temperature due to the heat of reaction. When the reaction was complete, 150 parts of ice were added and the two liquid phases separated. The dioxane layer was washed with dilute hydrochloric acid until the excess pyridine was removed, with sodium carbonate until neutral, and finally with water. Heating for one hour at 70° C. removed substantially all of the color and left a nearly colorless transparent liquid which was identified as 2-(oxycarballyloxy)ethyl N-[2-(oxycarballyloxy)ethyl] carbamate having the molecular structure:

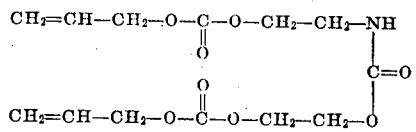

A sample was mixed with 5 percent by weight of benzoyl peroxide and heated at 70° C. for 72 hours. A hard transparent polymer having a slight yellow color was obtained.

*Example II*

Ethylene carbonate and propanolamine were reacted using the procedure described in Example I to form 2-hydroxyethyl N-(3-hydroxypropyl) carbamate which was subsequently reacted with allyl chloroformate by the procedure described in Example I. A compound having the following molecular composition was thereby synthesized:

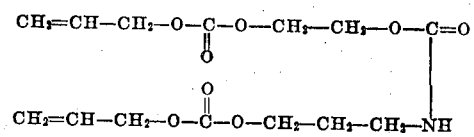

*Example III*

48 parts by weight of the bis 2-hydroxyethyl N-(2-hydroxyethyl) carbamate produced in accordance with the method described in Example I was dissolved in 200 parts of dioxane. Phosgene was passed through the solution at a rate which permitted the maintenance of the reaction temperature below 20° C. When the solution was saturated with phosgene the reaction was stopped. The reaction vessel was cooled by immersion in an ice bath. The resulting solution was then washed with water containing a small quantity of hydrochloric acid and added slowly at the rate of about two to three parts by weight per minute for 20 minutes and then as rapidly as possible without permitting the reaction temperature to exceed 10° C., to a precooled (0° C.) mixture of 50 parts of methallyl alcohol and 50 parts of pyridine. After the reaction the dioxane layer was separated and washed successively with dilute hydrochloric acid, sodium carbonate solution and with water. After treating with one percent of activated charcoal for 30 minutes at 70° C. a substantially colorless liquid ester was obtained. It was identified as 2-(oxycarbomethallyloxy)ethyl N-[2-(oxycarbomethallyloxy)ethyl] carbamate.

*Example IV*

Using the procedure described in Example III except substituting allyl alcohol for methallyl alcohol and ester identical with that produced by Example I was prepared.

Although the invention has been described with respect to specific modification, it is not intended that the invention shall be limited to said modifications except as defined in the appended claims.

What I claim is:

1. An (oxycarbalkenyloxy)alkyl N-[(oxycarbalkenyloxy)alkyl] carbamate, wherein each alkenyloxy radical contains a single olefinic linkage attached to the second carbon atom from the oxygen atom therein.
2. An (oxycarbalkenyloxy)alkyl N-[(oxycarbalkenyloxy)ethyl] carbamate, wherein each alkenyloxy radical contains a single olefinic linkage attached to the second carbon atom from the oxygen atom therein.
3. An (oxycarbalkenyloxy)alkyl N-[(oxycarbalkenyloxy)propyl] carbamate, wherein each alkenyloxy radical contains a single olefinic linkage attached to the second carbon atom from the oxygen atom therein.
4. 2-(oxycarballyloxy)ethyl N-[2-(oxycarballyloxy)ethyl] carbamate.
5. 2-(oxycarballyloxy)ethyl N-[3-(oxycarballyloxy)propyl] carbamate.
6. 2-(oxycarbomethallyloxy)ethyl N-[2-(oxycarbomethallyloxy)ethyl] carbamate.
7. A polymer of the compound defined by claim 1.
8. A polymer of the compound defined by claim 4.
9. A polymer of the compound defined by claim 5.
10. A polymer of the compound defined by claim 6.
11. A method of preparing an (oxycarbalkenyloxy)alkyl N-[(oxycarbalkenyloxy)alkyl] carbamate wherein each alkenyloxy radical contains a single olefinic linkage attached to the second carbon atom from the oxygen atom, which comprises reacting an aliphatic amino alcohol which contains a single amino group and a single hydroxy group with an alkylene carbonate to form an hydroxyalkyl N-(hydroxyalkyl) carbamate, and subsequently reacting the hydroxyalkyl N-(hydroxyalkyl) carbamate with the chloroformate of the group consisting of vinyl chloroformate, allyl chloroformate and methallyl chloroformate in the presence of an alkaline agent of the group consisting of pyridine and the oxides, carbonates and hydroxides of the alkali metals.

FRANKLIN STRAIN.